Jan. 19, 1937.    T. H. SCHOEPF ET AL    2,068,572
ARTICULATED CAR
Original Filed March 21, 1935    3 Sheets-Sheet 1

Inventors
THEODORE H. SCHOEPF,
DAVID M. RITCHIE,

Attorneys

Jan. 19, 1937.  T. H. SCHOEPF ET AL  2,068,572
ARTICULATED CAR
Original Filed March 21, 1935  3 Sheets-Sheet 2

Inventors
THEODORE H. SCHOEPF,
DAVID M. RITCHIE,
Attorneys

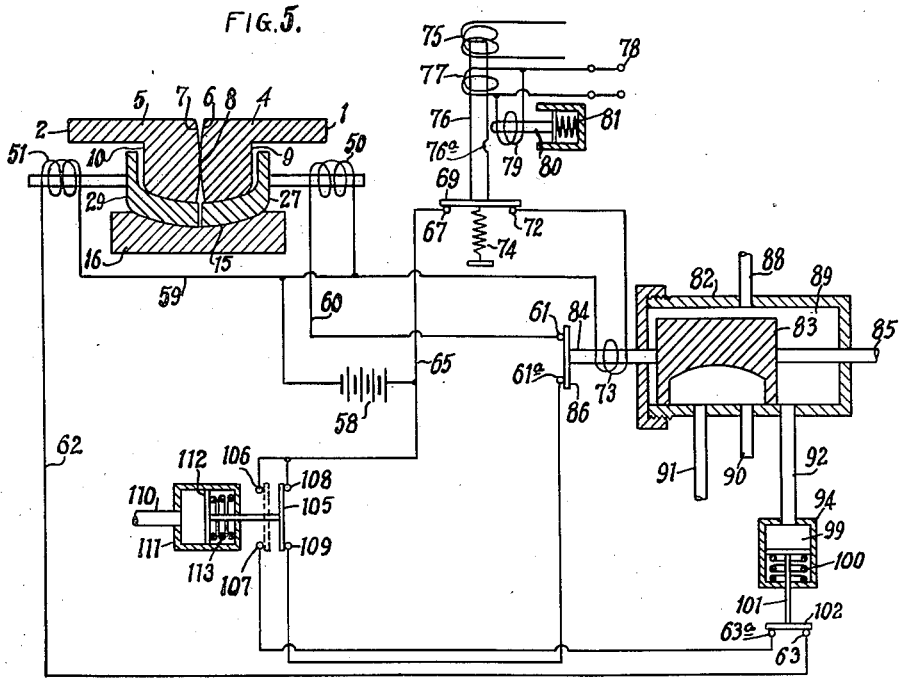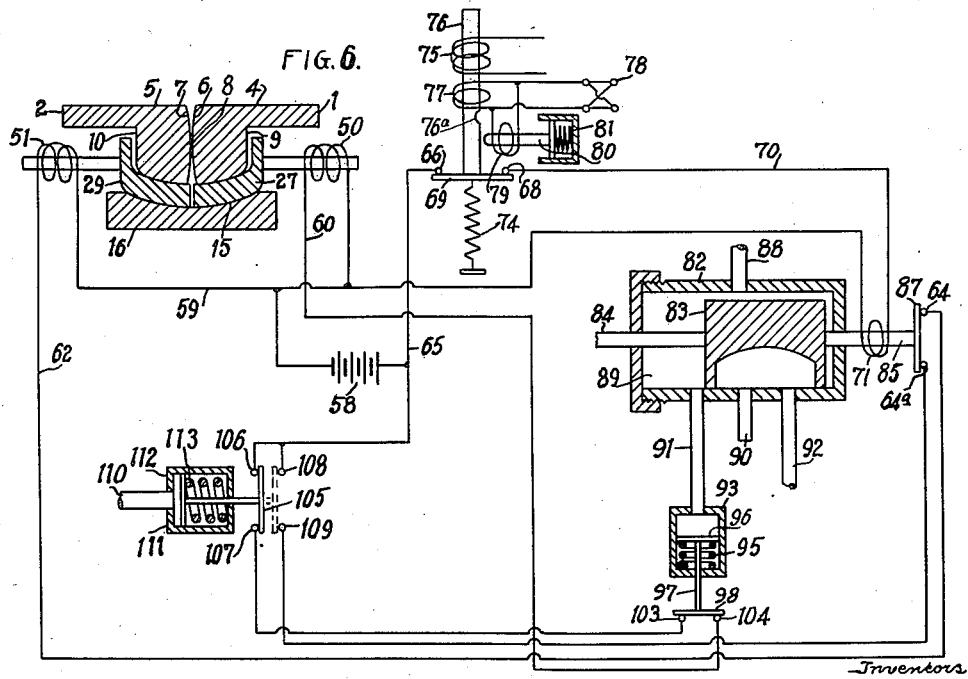

Patented Jan. 19, 1937

2,068,572

UNITED STATES PATENT OFFICE 2,068,572

ARTICULATED CAR

Theodore H. Schoepf and David M. Ritchie, Cincinnati, Ohio, assignors to The Cincinnati Traction Building Co., Cincinnati, Ohio, a corporation of Ohio Original application March 21, 1935, Serial No. 12,225. Divided and this application January 29, 1936, Serial No. 61,344

20 Claims. (Cl. 105—4)

Our invention relates to articulated cars.

It is a particular object of the invention to provide shock-absorbing means between the trunnions on the ends of articulated cars and the truck and the truck bolster supporting the trunnions.

Heretofore, in non-articulated cars, the shock of stopping and starting has been absorbed by the couplers through springs and the like. With the adoption of the articulated car construction, this shock-absorbing means was eliminated and all shocks were transmitted directly through the car bodies, either directly to the car proper or to the trunnions, center plates, the truck bolster and the truck.

It is a further object of this invention to permit of relative movement of the center plate with respect to the bolster of a car truck when the center plate is carrying articulated trunnions, and it is an object to provide means of restraining this movement at those times when braking of the train takes place.

It is an object to effect this restraint in conjunction with a magnetic track brake system or with a magnetic apparatus used therefor. The application of and operation of the air brake is utilized with the retarding means for retarding the movement of the trunnion support so that when the maximum tendency toward relative movement of the car bodies occurs, there will be a maximum resistance to such movement.

This application is a division of our copending application Serial No. 12,225, filed March 21, 1935.

Referring to the drawings:

Figure 5 is a view similar to Figure 4, showing the position of the parts when the magnetic forces oppose one another;

Figure 6 is a similar view showing the position of the parts when the reverser has been positioned to produce magnetic forces which are added to one another.

Figure 1:
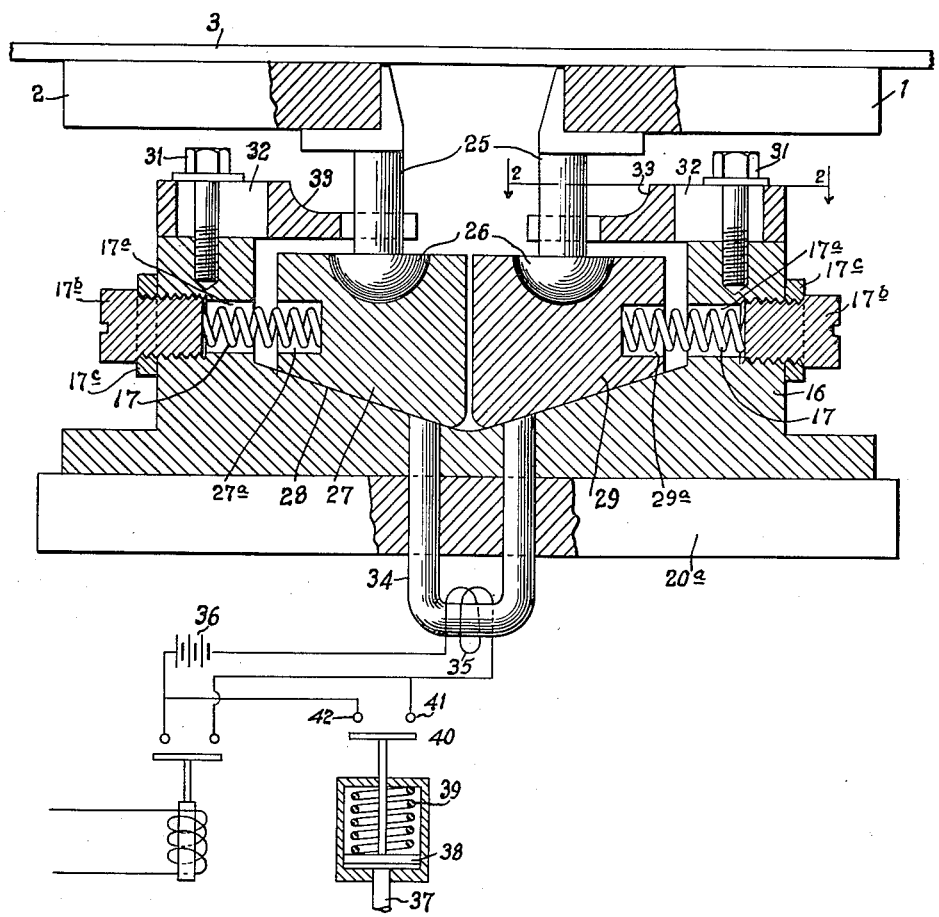
Figure 1 is a vertical sectional view through the bifurcated, independent slidable supports, the bases of which are inclined for engaging similar inclined surfaces on the bolster; there is further shown magnetic means for restraining the movement of the bifurcated sockets with their trunnions.
Figure 2:
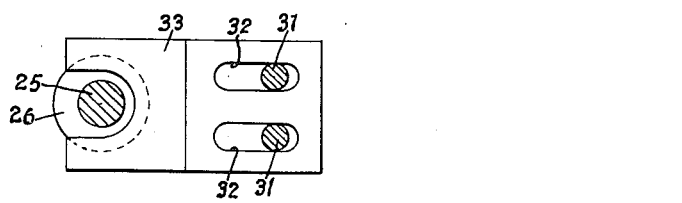
Figure 2 is a view taken on the line 2—2 of Figure 1, showing the trunnion shafts and yoke-retaining bolts in section.

Referring to the drawings, 1 is a car platform and 2 is a platform of an adjacent car. 3 designates the overlapping platform of a communicating vestibule. The respective car platforms 1 and 2 are provided with integral, downwardly extending trunnions 4 and 5 (Figures 4, 5 and 6), having engaging arcuate faces 6 and 7 that are adapted to rock upon one another when the bodies assume different horizontal planes with respect to one another or swing laterally with respect to one another. The point of contact 8 between the abutting trunnions shifts according to the rocking movement of the respective car platforms. The rear surfaces of the trunnions are semi-circular, as at 9 and 10. They conform to the interior surfaces of the halves 27 and 29, constituting the trunnion sockets. These trunnion sockets are provided with arcuate bottoms resting in an arcuate depression in the center plate carrier 16.

As shown particularly in the embodiment illustrated in Figure 1, springs 17 are used to urge the respective halves of the socket plate toward one another. These springs 17 each have one end disposed in opposed bores 17a in the center plate carrier 16, and the other end disposed in a bore in each of the socket plates 27 and 29, which bores are denoted respectively 27a and 29a. Adapted to engage the rear of the respective springs are adjusting plugs 17b, screw-threaded in the carrier 16 to permit of adjustment of the tension of the springs. The plugs 17b each have lock nuts 17c, screw-threaded thereon whereby they may be locked in adjusted position in the carrier 16. In this embodiment, the socket plates 27 and 29 have inclined bottom faces which engage the inclined faces 28 of the center plate carrier 16. This center plate carrier 16 is shown as supported by the bolster of a common supporting truck for the respective ends of the car platforms 1 and 2. As shown in Figure 1, the car platforms 1 and 2 carry depending trunnion shafts 25 having hemispherical trunnion heads 26 mounted in the socket plates 27 and 29, which, as pointed out above, are slidably disposed within the center plate carrier 16. The springs 17, which are disposed within opposed sockets in the walls of the center plate carrier 16 and in the rear faces of the center plates 27 and 29 respectively, urge these center plates toward one another. A pair of yokes 33 is supported on the top face of the center plate carrier 16 and these yokes have inwardly directed bifurcated portions which straddle the respective trunnion shafts 25. These yokes 33 are secured to the center plate carrier by means of bolts 31, which extend through slots 32 therein. The yokes serve to retain the trunnions 26 from jumping out of their sockets in the center plates 27 and 29 respectively, and also prevent excessive displacement of the socket plates 27 with respect to the carrier 16.

In order to resist movement of the center plate or socket plate blocks 27 and 29 on the inclined surfaces of the center plate carrier 16, we provide a horseshoe magnet 34 energized by the solenoid coil 35 and supplied with energy from the battery 36 or any other suitable source of electric supply. When the brakes are applied and it is desired to reduce the relative movement resulting between the car platforms 1 and 2, air is applied through the pipe 37 through the piston 38 in opposition to the spring 39. This causes the switch blade 40 to engage the terminals 41 and 42, thus connecting the coil 35 in circuit with the battery 36.

Figure 3:
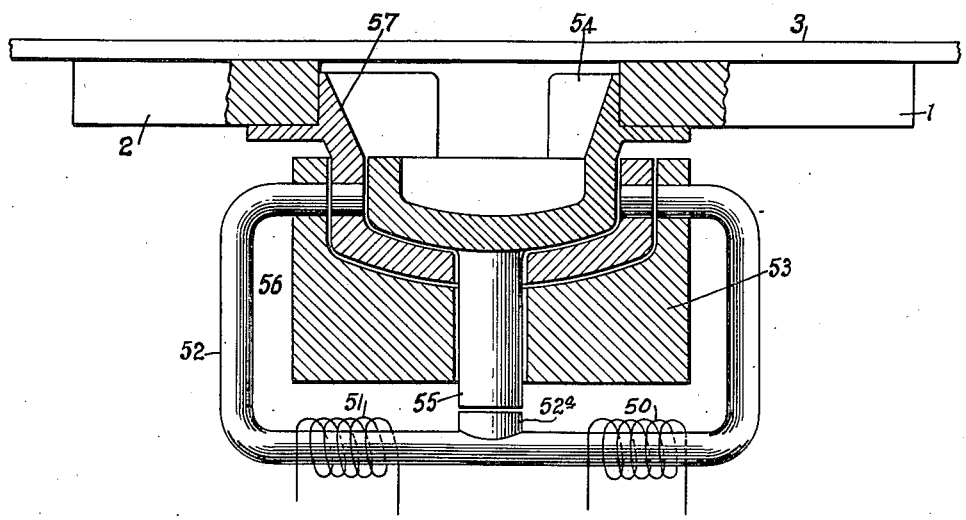
Figure 3 is a sectional view similar to Figure 1, showing the magnetic arrangement used with a modified form of trunnion sockets and solenoids, the effect of which may be added or subtracted one with respect to the other.

In Figure 3, is illustrated a modification wherein trunnions 54 and 57 are attached to the ends of the respective car platforms 1 and 2, which trunnions comprise interfitting cup-shaped members, of which the inner trunnion 54 is provided with a downwardly extending core 55, which extends through a suitable aperture in the trunnion 57 and also through a bore in the socket plate 53 which, like the center plate carrier 16 of Figure 1, is adapted to be supported by the bolster of a truck (not shown). The horseshoe magnet 52 has a centrally arranged pole member 52a which cooperates with the core 55 of the trunnion 54. When the coils 50 and 51 are energized the several trunnions are clamped together with respect to one another and with respect to the socket plate 53 by means of the horseshoe magnet 52, and their lateral movement is thus restricted.

The purpose is to automatically energize the solenoids 50 and 51 associated with the articulated center bearings, whereby the clearance between the trunnions or sockets or socket halves is closed selectively in conformity with the direction of train movement or the forces controlling the train movement (Figures 3, 4, 5 and 6).

Figure 4:
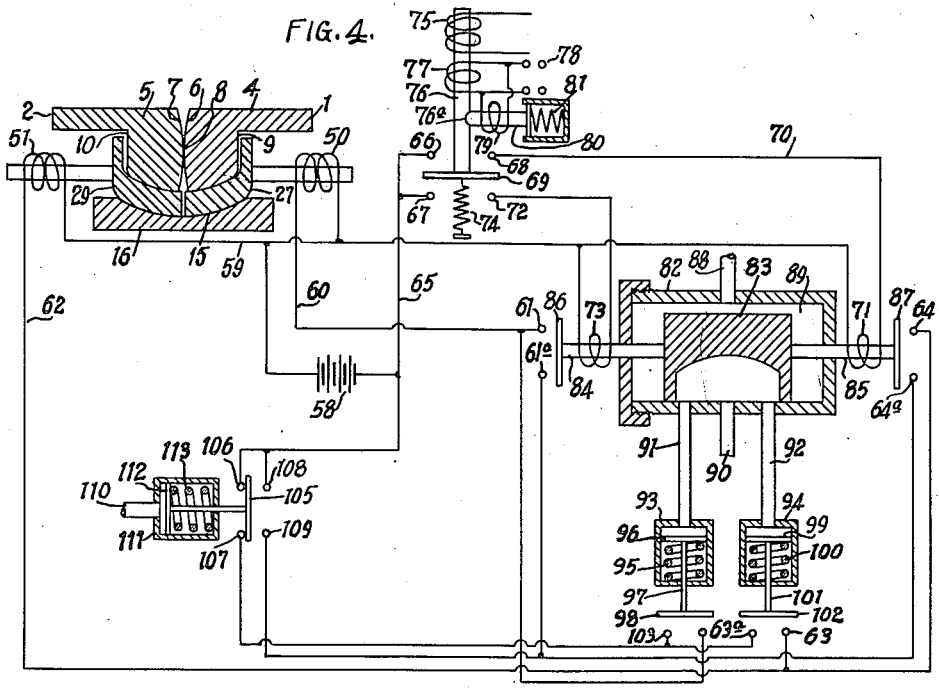
Figure 4 is a diagrammatic view showing the electrical and valve connections for magnetizing the magnetic retarding means for controlling the movement of the bifurcated trunnion sockets.

Referring particularly to Figures 4, 5 and 6, the storage battery 58 is connected to the line 59, which connects the two coils 50 and 51. The coil 50 has its other side connected by the wire 60 to the terminal 61. The coil 51 has its other side connected by the wire 62 to the terminals 63 and 64. The battery 58 has the other side thereof connected to the wire 65 which terminates in two terminal points 66 and 67. Oppositely disposed from the terminal point 66 is the terminal 68, which is adapted to be connected to the terminal 66 by the switch blade 69. The terminal 68 is connected by the wire 70 to the coil 71, which coil 71 has its other end connected to the wire 59. Opposite the terminal 67 is a terminal 72 which is connected by means of a wire to one end of the coil 73, the other end of the coil is, in turn, connected to the line 59. The switch blade 69 is disposed at the end of the core 76, which core is urged downwardly by the spring 74, which tends to connect the terminals 67 and 72 by means of the switch blade 69. Disposed about the core 76 is a pair of coils 75 and 77 respectively, which oppose the spring 74. The spring 74 is strong enough to overcome the pull of coil 75 on the core 76. This coil 75 is normally energized from some source of electrical energy, such as the battery 58. The coil 77, when energized, plus the coil 75, when energized, is strong enough to overcome the spring 74 and close the switch blade 69 across the terminals 66 and 68. 78 is a reverser for the traction motor circuit, whereby coil 77 is energized only when electrical power is supplied to the traction motors so that the pull of coil 77 responds only to the direction in which the motors are driving the car. In other words, when the car is traveling in one direction, the pull of the coil 77 is additive to that of the coil 75 to oppose the tension on the spring 74, while, in the other direction of movement of the car, the pull of the coil 77 is additive to the tension of the spring 74, and the sum of these forces is greater than the pull of normally energized coil 75.

Disposed at one side of the core 76 is a notch 76a which is adapted to be engaged by the locking solenoid 80, which is operated by the coil 79. The circuit of the locking coil 79 is such that energization of coil 77 also energizes the coil 79 which controls the locking solenoid 80. The solenoid 80 is normally held in operative position by the spring 81.

When the electrical power is supplied to the traction motors through the reverser 78, the coil 79 is energized and the interlock solenoid 80 is withdrawn from engagement with the core 76, while at the same time the coil 77 is energized to pull either with or against the coil 75. When the coil 77 pulls in the same direction as the coil 75, the combined pull overpowers the spring 74 and the pull of the coil 79 overcomes the spring 81, whereby the interlock or locking solenoid 80 is withdrawn from engagement with the core 76 which is drawn upwardly until the switch blade 69 bridges the contacts 66 and 68 and connects the circuit therethrough. After the coil 77 is connected so that its pull opposes the pull of the coil 75, then, when the coil 77 is energized, the coil 79 is also energized and releases the interlock or locking solenoid 80 from the core 76, which is drawn downwardly by the spring 74, the tension of which, in addition to the downward pull of the coil 77, is greater than the upward pull of the coil 75. When the core 76 is drawn downwardly, the switch blade 69 connects the contacts 67 and 72 and thereby completes the electrical circuit therethrough.

When the switch blade 69 is in the upper position, a circuit is completed from the battery 58 to energize the coil 71. If the switch blade 69 bridges the lower contacts, a circuit is completed through the coil 73. A solenoid-actuated valve is generally designated 82, which valve has a sliding valve member 83, to which are connected cores 84 and 85 which operate, respectively, in the afore-described coils 73 and 71 respectively, which cores carry the respective switch blades 86 and 87. The valve member 83 is slidably mounted in the chamber 89, to which compressed air is supplied through the pipe 88. An air exit pipe is provided at 90. Pressure pipes 91 and 92 communicate respectively with the cylinders 93 and 94. In the cylinder 93 is a spring 95 which operates to normally move the piston 96 upwardly in the cylinder 93. The piston 96 carries a piston rod 97, which has a switch blade 98 at the opposite end thereof. Likewise the cylinder 94 carries the piston 99, spring 100, piston rod 101 and switch blade 102, which parts operate in the same manner as the corresponding parts of the cylinder 93, described above.

When the coil 71 is energized, as shown particularly in Figure 6, pressure is applied on piston 96 through the pipe 91, and the piston 96, piston rod 97 and switch blade 98 are forced downwardly against the pressure of spring 95, whereby the switch blade 98 bridges the contact points 103 and 104. This also results in connecting the contacts 64 and 64a. When, as shown in Figure 5, the coil 73 is energized, the switch blade 86 connects the contacts 61 and 61a, and the blade 102 connects the contacts 63 and 63a. At this point, the application of air pressure for applying brakes to the cars will have already disengaged the switch blade 105 from the contacts 106 and 107 and move the switch blade into engagement with the contacts 108 and 109 (Figures 5 and 6). Air from the brake system is supplied through the pipe 110 to the cylinder 111 to actuate the piston 112 against the spring 113. The switch blade 105 is supported at the end of a piston rod carried by the piston 112. Thus, for the application of force to either of socket plates 27 or 29 (Figures 4, 5 and 6) a circuit is established between the battery 58 and contacts 108 and 109 to either of the solenoids 50 or 51 respectively.

After the supply of electrical power has been shut off from the traction motors and the air brakes are applied, compressed air from the brake system is supplied to cylinder 111 through the pipe 110. The switch blade 105 is moved into contact with the contacts 108 and 109. This opens the circuit from the battery 58 through either switch blade 98 or switch blade 102 to coils 50 or 51 respectively. The bridging of the contacts 108 and 109 establishes the circuit from the battery 58 through the bridging switch blades 98 or 102 through coils 50 or 51 respectively, the opposite of 50 or 51 being energized when the traction motors were last driving.

In Figure 5, the parts are shown in a position taken when the coils 75 and 77 respectively are connected so that their magnetic pulls or forces oppose one another and the spring 74 is enabled to draw the switch blade 69 downwardly to complete the circuit between the contacts 67 and 72. It is seen that, in this position, the coil 73 pulls the slide 83 to the left, as shown in Figure 5, which allows compressed air to flow through pipe 92 into cylinder 94 to urge the switch blade 102 into contact with the contacts 63 and 63a, whereby to complete the circuit therebetween and thus energize the coil 51. If the brakes are applied, the switch blade 105 opens the circuit between contacts 106 and 107 and then establishes the circuit between contacts 108 and 109 to energize the coil or solenoid 50. The reason for changing from 50 to 51, or the reverse order, is that, when the traction motors are driving, all clearance between the trunnions and socket must be taken up at one side, whereas the clearance must be taken up at the opposite side when braking. In some of the arrangements of the trunnions and sockets shown with magnetic cores, as, for instance, Figure 3, no clearances can develop, yet the scheme shown herein is still effective and exceedingly desirable.

Figure 6 shows the electrical circuits and positions of the various parts when the reverser 78 has been so positioned as to energize the coil 77 so that its magnetic pull is added to that of solenoid coil 75, which additive forces overbalance the tension of the spring 74 to draw the switch blade 69 upwardly against the contacts 66 and 68 to complete the circuit therebetween and thus energize the coil 71, whereby the valve member 83 is drawn to the right, as seen in Figure 6, and compressed air is conducted through the pipe 91 to cylinder 93, whereby to urge the piston 96 and switch blade 98 downwardly, whereby to complete the circuit between contacts 103 and 104. When the valve slide or member 83 is in the righthand position (Figure 6), the switch blade 87 is in contact with the contacts 64 and 64a, whereby to complete the circuit therethrough. It will thus be seen that, by our arrangement, the trunnions are adjusted magnetically during the driving by the driving motors and according to the direction of driving by the driving motors, and that, when the driving motors are made inoperative and the brakes are applied, the trunnions are magnetically readjusted.

It will be understood that the above description is illustrative and in no wise limiting, and that we desire to comprehend within our invention such modifications as may be clearly embraced within the claims and the scope of our invention.

Having thus fully described our invention, what we claim as new and desire to secure by Letters Patent, is:

1. In combination, car platforms having depending trunnions, independent socket plates therefor, a socket plate carrier upon which said socket plates are slidably mounted, and magnetic means for regulating the movement and position of said socket plates on said carrier.

2. In combination, car platforms having depending trunnions, independent socket plates therefor, a socket plate carrier upon which said socket plates are slidably mounted, magnetic means for regulating the movement and position of said socket plates on said carrier, and means controlled by the application of the brakes of the railway cars on which the trunnions are mounted for controlling the application of the magnetic means.

3. In combination, car platforms having depending trunnions, independent socket plates therefor, a socket plate carrier upon which said socket plates are slidably mounted, magnetic means for regulating the movement and position of said socket plates on said carrier, means controlled by the application of the brakes of the railway cars on which the trunnions are mounted for controlling the application of the magnetic means, and electrical means connected to the electric driving means for the cars adapted to control the application of said magnetic means.

4. In combination, car platforms having trunnions abutting one another, socket plate means for receiving said trunnions, means to support the socket plate means on a common truck, and magnetic means for controlling the clearance between the trunnions and socket plate means.

5. In combination, car platforms having trunnions abutting one another, individual socket plate means for receiving each of said trunnions, means to support the socket plate means on a common truck, magnetic means for controlling the clearance between the trunnions and the socket plate means, and electrical means connected to the electric driving motors for the cars for regulating the actuation of the magnetic means in order to position the trunnions and socket plate means according to the direction of movement of the motors.

6. In combination, car platforms having trunnions abutting one another, individual socket plate means for receiving each of said trunnions, means to support the socket plate means on a common truck, magnetic means for controlling the clearance between the trunnions and the socket plate means, and means connected to the braking means for adjusting the magnetic means according to the braking of the cars.

7. In combination, car platforms having trunnions abutting one another, individual socket plate means for receiving each of said trunnions, means to support the socket plate means on a common truck, magnetic means for controlling the clearance between the trunnions and the socket plate means, electrical means connected to the electric car driving motors for regulating the actuation of the magnetic means in order to position the trunnions and socket plate means according to the direction of movement of the motors, and means operable when the motors are inoperative and actuated by the braking means for regulating the magnetic means and the positioning of the trunnions and the socket plate means.

8. In combination, trunnions, individual socket plate means for receiving each of said trunnions, oppositely arranged magnetic means associated with the socket plate means and trunnions for positioning the socket plate means and trunnions respectively one with the other according to the direction of movement of the cars of which the trunnions are a part, and electrical means for selectively actuating the magnetic means according to the direction of movement of electric driving motors of the cars when the driving motors are driving.

9. In combination, trunnions, individual socket plate means for receiving each of said trunnions, oppositely arranged magnetic means associated with the socket plate means and trunnions for positioning the socket plate means and trunnions respectively one with the other according to the direction of movement of the cars of which the trunnions are a part, electrical means for selectively actuating the magnetic means according to the direction of movement of the electric driving motors of the cars when the driving motors are driving, and means when the driving motors are not driving and the brakes are being applied for selectively actuating said magnetic means to adjust the position of the socket plate means and the trunnions for braking conditions.

10. In combination, cars having trunnions each adapted to be received in individual socket plates on common trucks, magnetic means for adjusting the position of the trunnions and socket plates, and electrical means associated with the electric traction motors driving the cars for so controlling the magnetic means as to position the trunnions with respect to the socket plates so that all clearance between the trunnions and socket plates is taken up on the side in the direction of movement of the cars.

11. In combination, cars having trunnions each adapted to be received in individual socket plates on common trucks, magnetic means for adjusting the position of the trunnions and socket plates, electrical means associated with the electric traction motors driving the cars for so controlling the magnetic means as to position the trunnions with respect to the socket plates so that all clearance between the trunnions and socket plates is taken up on the side in the direction of movement of the cars, and means associated with the braking means on the cars for selectively operating the magnetic means so that all of the clearance between the trunnions and socket plates will be taken up on the opposite side when braking.

12. In a railway car articulation, car platforms having trunnions thereon adapted to engage one another and to have lateral and vertical movement with respect to one another, longitudinal movable sockets for said trunnions and magnetic means for resisting the movements of said sockets.

13. In a railway car articulation, car platforms having trunnions thereon adapted to abut one another and to have lateral and vertical movement with respect to one another, a center plate carrier mounted on a common truck for said platforms, said center plate carrier having center plates therein adapted to pivotally engage the respective trunnions, resilient means for yieldingly urging said center plates toward one another, and magnetic means for resisting movement of said center plates in said center plate carrier.

14. In railway car articulation, a pair of car platforms, each having a trunnion shaft thereon, a center plate carrier mounted on a truck common to said car platforms, said center plate carrier having a pair of slidable center plates therein, each of said center plates having pivotal connection with one of said trunnion shafts, resilient means adapted to urge said center plates together in said carrier, and magnetic means for resisting movement of said center plates in said carrier.

15. In railway car articulation, a pair of car platforms, each having a trunnion shaft thereon, a center plate carrier mounted on a truck common to said car platforms, said center plate carrier having a pair of slidable center plates therein, each of said center plates having pivotal connection with one of said trunnion shafts, yoke means on said center plate carrier for retaining said center plates in said carrier, and resilient means in said carrier for urging said center plates toward one another, and magnetic means adapted to resist movement of said center plates in said center plate carrier.

16. In combination, in a car articulation, car platforms having trunnions with arcuate engaging faces adapted to permit vertical and horizontal movement of car platforms, semi-circular receiving sockets for said trunnions adapted to permit said platform movements, a socket plate carrier, and magnetic means adapted to resist movement of said sockets with respect to said socket plate carrier.

17. In combination, car platforms having trunnions thereon, independent socket plates for said trunnions, a common socket plate carrier for said socket plates, and magnetic means for resisting displacement of the socket plates with respect to the socket plate carrier.

18. In combination, in an articulation, a truck bolster, a socket plate carrier mounted thereon, a pair of complementary socket plates adapted to pivotally receive trunnions on abutting car platforms, said socket plates being movable with respect to said carrier, and magnetic means on said carrier for resisting movement of the socket plates thereon.

19. In a car articulation, a truck common to a pair of car platforms, said truck having a trunnion carrier thereon, a cup-shaped trunnion on one of said car platforms adapted to engage a complementary recess in said trunnion carrier, a second cup-shaped trunnion on said second car platform adapted to be received for pivotal movement within said first trunnion, said second trunnion having a core thereon adapted to extend through registering bores in said first trunnion and said trunnion carrier, and electromagnetic means mounted on said trunnion carrier adapted, by drawing said core downwardly, to resist pivotal movement of the trunnions with respect to one another and with respect to the trunnion carrier.

20. In combination, a pair of car platforms having a common truck, said truck having a trunnion carrier having a recess therein, one of said car platforms having a trunnion adapted to be rotatably received in said recess, and the other of said platforms having a trunnion adapted to be rotatably supportd by said first trunnion, said trunnion carrier having electromagnetic means adapted, when operated, to lock the trunnions with respect to one another and with respect to the trunnion carrier.

THEODORE H. SCHOEPF.
DAVID M. RITCHIE.